United States Patent
Cheng

(10) Patent No.: US 11,734,870 B2
(45) Date of Patent: Aug. 22, 2023

(54) SYSTEMS AND METHODS FOR TEXTURE MAPPING FOR A 3D MODEL

(71) Applicant: Ke.com (Beijing) Technology Co., Ltd., Beijing (CN)

(72) Inventor: Mofang Cheng, Beijing (CN)

(73) Assignee: KE.COM (BEIJING) TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 17/461,850

(22) Filed: Aug. 30, 2021

(65) Prior Publication Data

US 2022/0068006 A1  Mar. 3, 2022

(30) Foreign Application Priority Data

Sep. 1, 2020 (CN) .......................... 202010904473.X

(51) Int. Cl.
*G06T 15/04* (2011.01)
*G06T 3/40* (2006.01)
*G06T 3/60* (2006.01)
*G06T 17/20* (2006.01)

(52) U.S. Cl.
CPC .............. *G06T 15/04* (2013.01); *G06T 3/40* (2013.01); *G06T 3/60* (2013.01); *G06T 17/20* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 6,750,873 | B1* | 6/2004 | Bernardini | G06T 7/55 345/581 |
| 2005/0190179 | A1* | 9/2005 | Hong | G06T 15/04 345/428 |
| 2006/0227131 | A1* | 10/2006 | Schiwietz | G06T 15/08 345/419 |
| 2008/0238942 | A1* | 10/2008 | Sun | G06T 11/60 345/634 |

(Continued)

OTHER PUBLICATIONS

Wang, Chao, and Xiaohu Guo. "Plane-based optimization of geometry and texture for RGB-D reconstruction of indoor scenes." 2018 International Conference on 3D Vision (3DV). IEEE, 2018.*

*Primary Examiner* — Sultana M Zalalee
(74) *Attorney, Agent, or Firm* — Bayes PLLC

(57) ABSTRACT

Systems and methods for constructing a three-dimensional virtual reality model of a property are disclosed. An exemplary system includes a storage device configured to store a structure mesh of the three-dimensional virtual reality model and texture images captured of the property. The system further includes at least one processor configured to extract a planar area from the structure mesh of the three-dimensional virtual reality model. The at least one processor is further configured to obtain initial texture patches for the planar area from the texture images, determine a target texture patch for the planar area from the initial texture patches projected to an imaging plane of a virtual camera, and add the target texture patch to a texture atlas. The at least one processor is also configured to construct the three-dimensional virtual reality model by mapping the texture atlas to the structure mesh of the three-dimensional virtual reality model.

20 Claims, 8 Drawing Sheets

(56) References Cited

U.S. PATENT DOCUMENTS

| | | | |
|---|---|---|---|
| 2011/0304611 A1* | 12/2011 | Suzuki | G06T 15/04 345/582 |
| 2014/0119664 A1* | 5/2014 | Ioffe | G06T 5/002 382/195 |
| 2017/0193699 A1* | 7/2017 | Mehr | G06T 17/205 |
| 2017/0323443 A1* | 11/2017 | Dhruwdas | G06T 11/006 |
| 2018/0144535 A1* | 5/2018 | Ford | G06T 15/005 |
| 2019/0035160 A1* | 1/2019 | Huo | G06F 3/04883 |
| 2021/0195162 A1* | 6/2021 | Chupeau | H04N 21/21805 |

\* cited by examiner

SYSTEMS AND METHODS FOR TEXTURE MAPPING FOR A 3D MODEL

CROSS-REFERENCE TO RELATED APPLICATIONS

This application hereby claims the benefits of priority to Chinese Application No. 202010904473.X, filed on Sep. 1, 2020, which is hereby incorporated by reference in its entirety.

TECHNICAL FIELD

The present disclosure relates to systems and methods for rendering a three-dimensional (3D) Virtual Reality (VR) model, and more particularly, to systems and methods for texture mapping in 3D model rendering by determining target texture patches for two-dimensional (2D) planar areas extracted from the 3D model.

BACKGROUND

In the real estate market, when a person wants to buy or rent a property, he typically would ask to tour the property first in order to visually experience the layout and furnishing. House tours are often conducted in person, e.g., by the property owner or a real estate agent. During the tour, the visitor gets to see the property and the property owner/agent accompanying the tour will introduce features of the property to the visitor. For example, when the visitor is in the kitchen, features such as size of the room, cabinet and counter space, installed appliances, and lighting conditions may be introduced orally. While property tours are informative to the potential buyer/renter, it is also time consuming and inefficient.

Recently, VR technology has been applied to conduct these tours virtually. Videos and images of the property are taken in advance. A three-dimensional model is rendered based on the data captured of the property, such as point cloud data and images. As a result, a visitor can remotely view the property without having to do it in person. On the other hand, the property owner/agent may log into the system to introduce the property features in real-time. VR tours thus save both visitor and property owner/agent's time by recreating the in-person experience virtually online.

To render a 3D VR model, tools like Direct3D usually performs a process known as texture mapping. Most textures, like bitmaps, are a two-dimensional array of color values, for example, captured by cameras. The individual color values are called a texture element, or texel. Each texel has a unique address in the texture. Direct3D maps texels in texture space directly to pixels on the surface of the 3D model in screen space. Adjacent texels can be grouped into a texture patch, which is typically a 2D texture image. A texture patch can be mapped to the surface of the 3D model. Texture mapping provides a 3D rendering that can accurately reflect the appearance of objects in the property.

However, existing texture mapping methods face challenges. These methods typically select a corresponding texture image for each polygon in the 3D model. An initial texture patch for the polygon is extracted from the texture image using a bounding box enclosing the corresponding texture information. Because initial texture patches for adjacent polygons can be extracted from different texture images, conventional methods then balance the color/lighting among those initial texture patches before coping them into a texture atlas. A texture atlas created by the conventional methods usually include a significant portion of non-effective areas, i.e., areas that do not contain useful texture information. The storage of initial texture patches with significant non-effective areas results in an unnecessarily large texture space. The rendering and displaying of the 3D model require the entire texture atlas to be loaded into the video memory in advance. Therefore, if the texture space is large, the display of the 3D model may freeze or sometimes crash.

SUMMARY

In one aspect, a system for constructing a three-dimensional virtual reality model of a property is disclosed. The exemplary system includes a storage device configured to store a structure mesh of the three-dimensional virtual reality model and texture images captured of the property. The system further includes at least one processor configured to extract a planar area from the structure mesh of the three-dimensional virtual reality model. The at least one processor is further configured to obtain one or more initial texture patches for the planar area from the texture images, determine a target texture patch for the planar area from the initial texture patches projected to an imaging plane of a virtual camera, and add the target texture patch to a texture atlas. The at least one processor is also configured to construct the three-dimensional virtual reality model by mapping the texture atlas to the structure mesh of the three-dimensional virtual reality model.

In another aspect, a computer-implemented method for constructing a three-dimensional virtual reality model of a property. The method includes extracting, by at least one processor, a planar area from a structure mesh of the three-dimensional virtual reality model. The method further includes obtaining one or more initial texture patches for the planar area from texture images captured of the property, determining, by the at least one processor, a target texture patch for the planar area from the initial texture patches projected to an imaging plane of a virtual camera, and adding the target texture patch to a texture atlas. The method also includes constructing, by the at least one processor, the three-dimensional virtual reality model by mapping the texture atlas to the structure mesh of the three-dimensional virtual reality model.

In yet another aspect, a non-transitory computer-readable medium having stored thereon computer instructions is disclosed. The computer instructions, when executed by at least one processor, perform a method for constructing a three-dimensional virtual reality model of a property. The method includes extracting, by at least one processor, a planar area from a structure mesh of the three-dimensional virtual reality model. The method further includes obtaining one or more initial texture patches for the planar area from texture images captured of the property, determining a target texture patch for the planar area from the initial texture patches projected to an imaging plane of a virtual camera, and adding the target texture patch to a texture atlas. The method also includes constructing the three-dimensional virtual reality model by mapping the texture atlas to the structure mesh of the three-dimensional virtual reality model.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
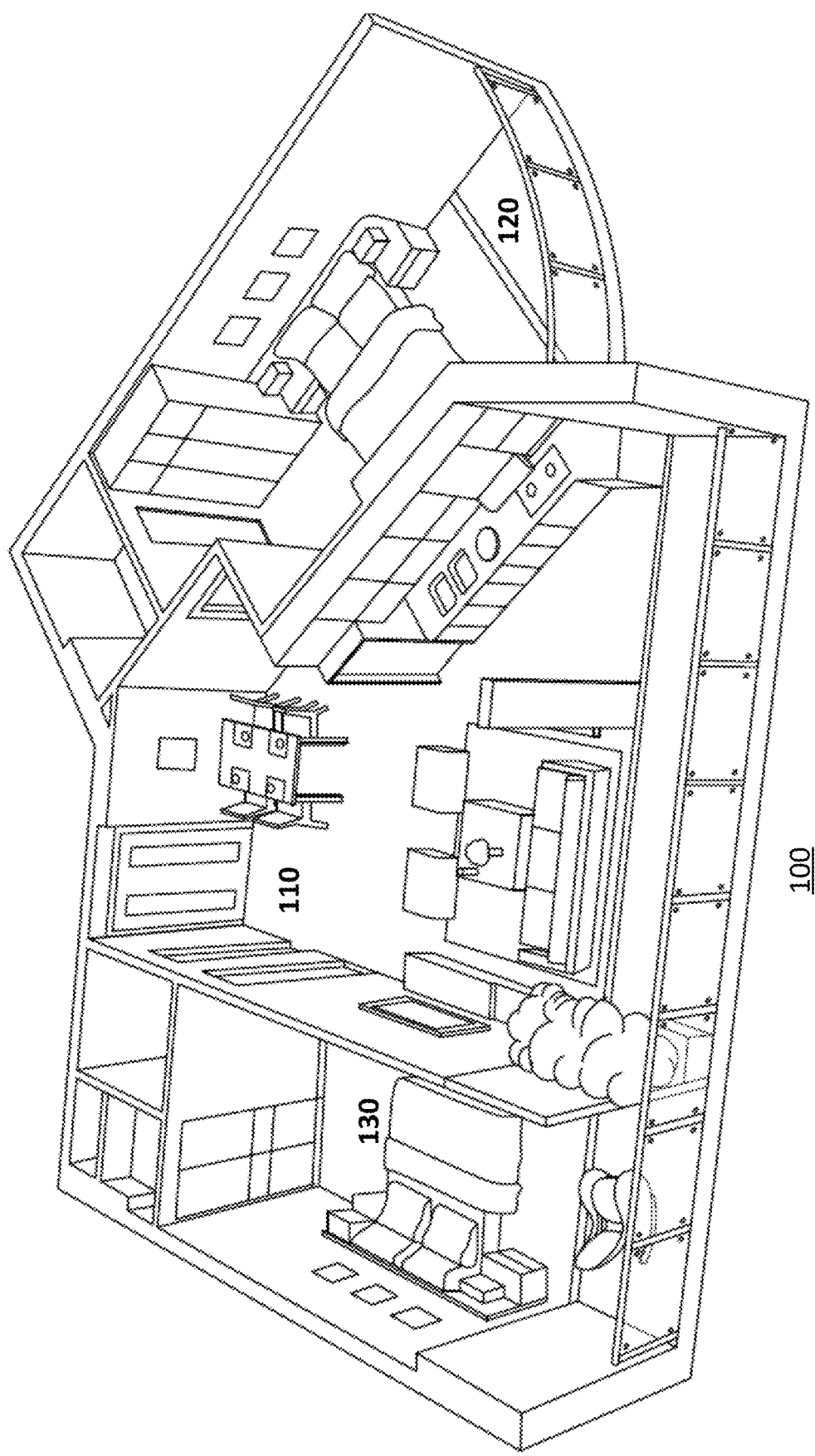
FIG. 1 illustrates a schematic diagram of an exemplary three-dimensional model including multiple rooms, according to embodiments of the disclosure.

FIG. 1 illustrates a schematic diagram of an exemplary three-dimensional model 100 including multiple rooms, according to embodiments of the disclosure. In some embodiments, three-dimensional model 100 may be a VR model of a property, such as a house, an apartment, a townhouse, a garage, a warehouse, an office building, a hotel, and a store, etc. As shown in FIG. 1, three-dimensional model 100 virtually recreates the real-world property including its layout (e.g., the framing structures that divide the property into several rooms such as walls and counters), finishing (e.g., kitchen/bathroom cabinets, bathtub, island, etc.), fixtures installed (e.g., appliances, window treatments, chandeliers, etc.), and furniture and decorations (e.g., beds, desks, table and chairs, sofas, TV stands, bookshelves, wall paintings, mirrors, plants, etc.)

Three-dimensional model 100 may be divided into multiple rooms or functional spaces by interior walls. Some rooms may have multiple functions. For example, three-dimensional model 100 may include a great room 110 that has combined functions of a living room and a kitchen. Three-dimensional model 100 may further include two bedrooms 120 and 130, their attached bathrooms, as well as balconies.

Various data may be captured in the property in order to create three-dimensional model 100. For example, a camera may be placed at various positions to capture images and/or videos of great room 110. In some embodiments, the camera may be a digital camera, a binocular camera, a video camera, a panoramic camera, etc. In some embodiments, a three-dimensional scanner may be configured to capture three-dimensional information (e.g., point cloud data or other data that includes depth information) of the room. The camera/scanner may be mounted on a mounting structure (e.g., a tripod) or be carried by an operator. The camera may be rotated or otherwise adjusted to capture images or videos from different angles and heights.

In some embodiments, three-dimensional model 100 may be constructed based on the point cloud data and images/video captured by the camera(s). Three-dimensional model 100 represents a property using a collection of points in three-dimensional space, connected by various geometric entities such as polygons, lines, curved surfaces, etc. In some embodiments, three-dimensional model 100 may be a shell/boundary model, such as a textured polygonal model created through polygonal modeling. In a textured polygonal model, points in a three-dimensional space (known as "vertices") are connected by line segments to form a polygon mesh. The model approximates curved surfaces using many polygons, such as triangles, quads, pentagons, hexagons, etc.

In some embodiments, a textured 3D model may be created in two steps. In the first step, a structure mesh may be constructed based on three-dimensional structural information, such as point cloud data. The structure mesh includes a set of polygons connected through their edges and vertices to form a curved surface of three-dimensional model 100. In other words, the structure mesh defines the structure (e.g., shape, size, curvature) of the three-dimensional model. The polygons in the structure mesh can be triangles, quads (four-sided polygons), or other polygons.

In the second step, texture information may be mapped to the structure mesh to form a textured mesh. For example, images of the room taken at various angles may be cut and pasted to the polygons in the structure mesh. That is, the textured polygon mesh "paints" the two-dimensional texture information onto the three-dimensional structure. The second step is also referred to as texture mapping, where texture patches are extracted from images and mapped to the corresponding polygons. The shape and size of the texture patches correspond to the shape and size of the polygons. For example, when a polygon is a triangle, the texture patch mapped to it will be a triangle patch.

Depending on the size and resolution of the 3D model, the texture mapping can be a resource consuming process. Conventional texture mapping methods extract texture patches corresponding to the polygons on the structure mesh from the images by copying bounding boxes that contain the texture information, and add such texture patches into a texture atlas stored in a storage. During rendering and display, the entire texture atlas has to be loaded into memory. The significant non-effective areas included in so-created texture atlas cause waste in storage and also delays or crashes for rendering or displaying the 3D model.

The disclosed systems and methods are designed to reduce the size of the texture atlas and therefore the space required to store it. The disclosed systems and methods achieve the technical improvements by reducing the portion of the non-effective areas in the texture atlas. In some embodiments, the disclosed systems and methods may store a structure mesh of the 3D model of property and the texture images captured of the property. Planar areas may be extracted from the structure mesh of the 3D model. The planar area can include one or more polygons (e.g., triangles). For each planar area, initial texture patches are obtained for the respective polygons in that planar area from the texture images. In some embodiments, these initial texture patches may be triangle patches corresponding to triangular-shaped polygons on the structure mesh.

A target texture patch is then determined for the planar area from the initial texture patches. In some embodiments, a bounding box of the planar area and its corresponding initial texture patches may be projected to an imaging plane of a virtual camera specifically set up for the planar area. The target texture patch can be initially formed based on the projected bounding box. In some embodiments, the size, and accordingly resolution, of the target texture patch may be adjusted to be consistent with the size and resolution of the initial texture patches. In some embodiments, the target texture patch may be further rotated to align its largest coordinate with the principal direction, thus minimizing the non-effective area therein. Using the above systems and methods, one target texture patch can be determined for each planar area extracted from the structure mesh model. These target texture patches are then added to a texture atlas. Compared to conventional systems and methods that extract and store all the initial texture patches by extracting bounding boxes of texture information, the disclosed systems and methods create a texture atlas that includes a smaller number of texture patches for planar areas and has an improved ratio of effective areas (i.e., a reduced ratio of non-effective areas). As a result, the overall storage space for the texture atlas can be effectively reduced.

The 3D model can be rendered by mapping the texture atlas to the structure mesh. Consistent with the present disclosure, instead of mapping the texture patches polygon by polygon onto the structure mesh, the disclosed systems and methods map the target texture patches to the respective planar areas on the structure mesh, each including multiple polygons. The amount of data loaded into memory for the rendering is reduced as well.

Although the exemplary three-dimensional model shown in FIG. 1 is a model for a property, it is contemplated that the disclosed systems and methods may also be applied to construct three-dimensional models of other objects, such as a vehicle, a person, an animal, a road segment, a park, etc. A person of ordinary skill can adapt the disclosed systems and methods without undue experimentation for different three-dimensional models.

Figure 2:
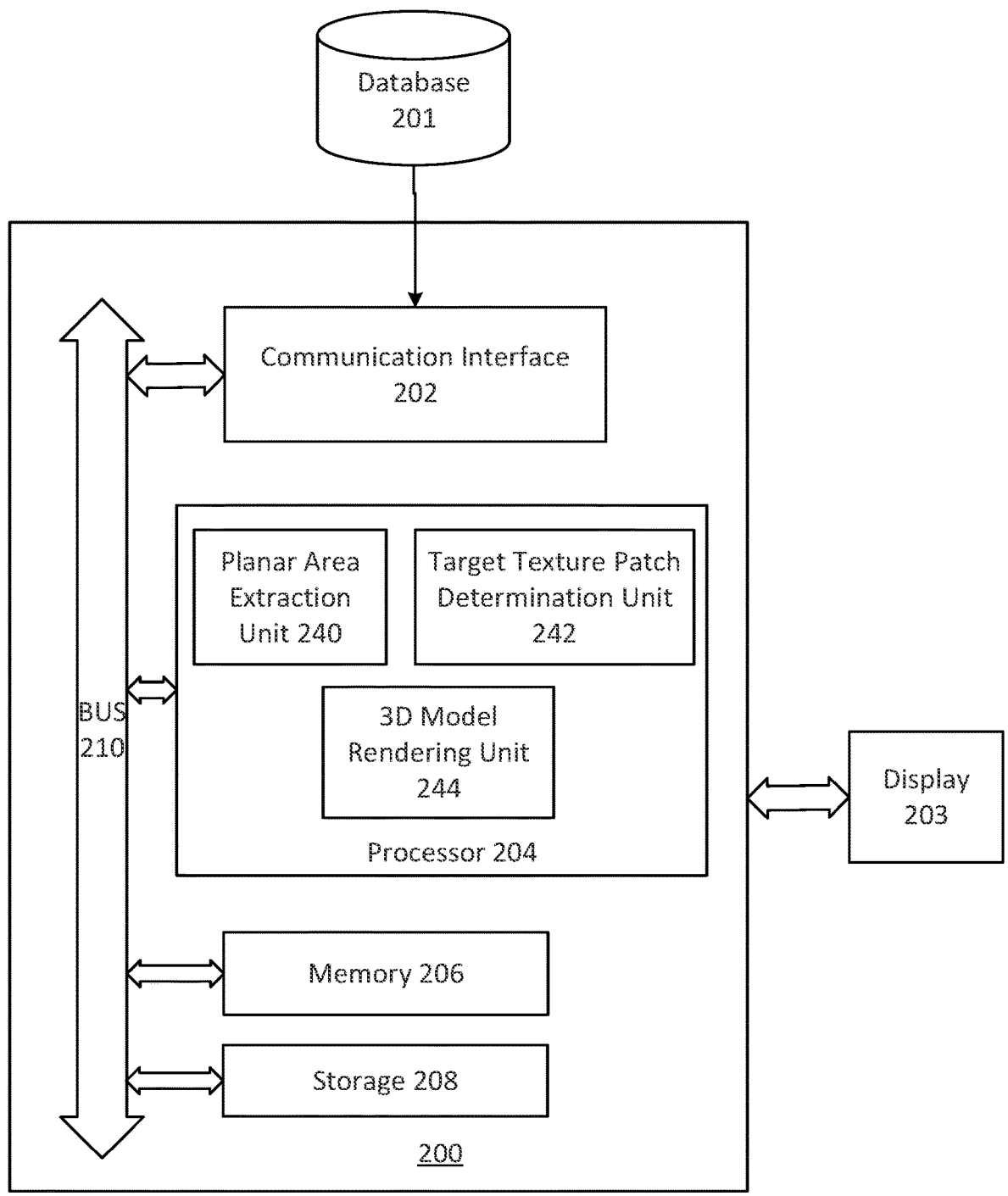
FIG. 2 is a block diagram of an exemplary system for constructing a three-dimensional model, according to embodiments of the disclosure.

FIG. 2 is a block diagram of an exemplary system 200 for constructing a three-dimensional model, according to embodiments of the disclosure. In some embodiments, system 200 may be implemented by a physical server or a service in the cloud. In some other embodiments, system 200 may be implemented by a computer or a consumer electronic device such as a mobile phone, a pad, or a wearable device. In some embodiments, the three-dimensional model e.g., three-dimensional model 100, may be rendered in real-time of the VR tour or offline prior to the tour.

As shown in FIG. 2, system 200 may include a communication interface 202, a processor 204, a memory 206, a storage 208, and a bus 210. In some embodiments, system 200 may have different modules in a single device, such as an integrated circuit (IC) chip (implemented as an application-specific integrated circuit (ASIC) or a field-programmable gate array (FPGA)), or separate devices with dedicated functions. Components of system 200 may be in an integrated device, or distributed at different locations but communicate with each other through a network (not shown). The various components of system 200 may be connected to and communicate with each other through bus 210.

Communication interface 202 may send data to and receive data from components database 201 via direct communication links, a Wireless Local Area Network (WLAN), a Wide Area Network (WAN), wireless communication networks using radio waves, a cellular network, and/or a local wireless network (e.g., Bluetooth or WiFi), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive structural information, e.g., a structure mesh of the 3D model (or point cloud data that can be used to construct such a structure mesh), and texture information, e.g., images and videos, captured of the property. For example, the structural information and texture information captured by camera/scanner in the property may be stored in database 201. Communication interface 202 may provide the received information or data to memory 206 and/or storage 208 for storage or to processor 204 for processing.

Processor 204 may include any appropriate type of general-purpose or special-purpose microprocessor, digital signal processor, or microcontroller. Processor 204 may be configured as a separate processor module dedicated to rendering 3D VR models. Alternatively, processor 204 may be configured as a shared processor module for performing other functions related to or unrelated to 3D model rendering. For example, VR property tour that uses 3D model rendering is just one application installed on a versatile device.

As shown in FIG. 2, processor 204 may include multiple modules, such as a planar area extraction unit 240, a target texture patch determination unit 242, and a 3D model rendering unit 244 and the like. These modules (and any corresponding sub-modules or sub-units) can be hardware units (e.g., portions of an integrated circuit) of processor 204 designed for use with other components or to execute part of a program. The program may be stored on a computer-readable medium (e.g., memory 206 and/or storage 208), and when executed by processor 204, it may perform one or more functions. Although FIG. 2 shows units 240-244 all within one processor 204, it is contemplated that these units may be distributed among multiple processors located near or remotely with each other.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform three-dimensionally modeling functions disclosed herein. For example, memory 206 and/or storage 208 may be configured to store program(s) that may be executed by processor 204 to render a 3D model of a property, e.g., providing a VR property tour to a user.

Memory 206 and/or storage 208 may be further configured to store information and data used by processor 204. For instance, memory 206 and/or storage 208 may be configured to store a structure mesh (or the point cloud data used to construct such a mesh) and various images/videos captured of a property. Memory 206 and/or storage 208 may also be configured to store intermediate data generated by processor 204, such as the initial texture patches, bounding boxes for the planar areas, target texture patches, the texture atlas, etc. The various types of data may be stored permanently, removed periodically, or disregarded immediately after each frame of data is processed.

In some embodiments, system 200 may optionally include a display 203. In some embodiments, display 203 may be external to system 200 but be connected with system 200. Display 203 may display the views in the three-dimensional model to the users. In some embodiments, display 203 may further function as a user interface to receive user input. Display 203 may include a Liquid Crystal Display (LCD), a Light Emitting Diode Display (LED), a plasma display, or any other type of display, and provide a Graphical User Interface (GUI) presented on the display for user input and data display. The display may include a number of different types of materials, such as plastic or glass, and may be touch-sensitive to receive commands from the user. For example, the display may include a touch-sensitive material that is substantially rigid, such as Gorilla Glass™, or substantially pliable, such as Willow Glass™.

Figure 3:
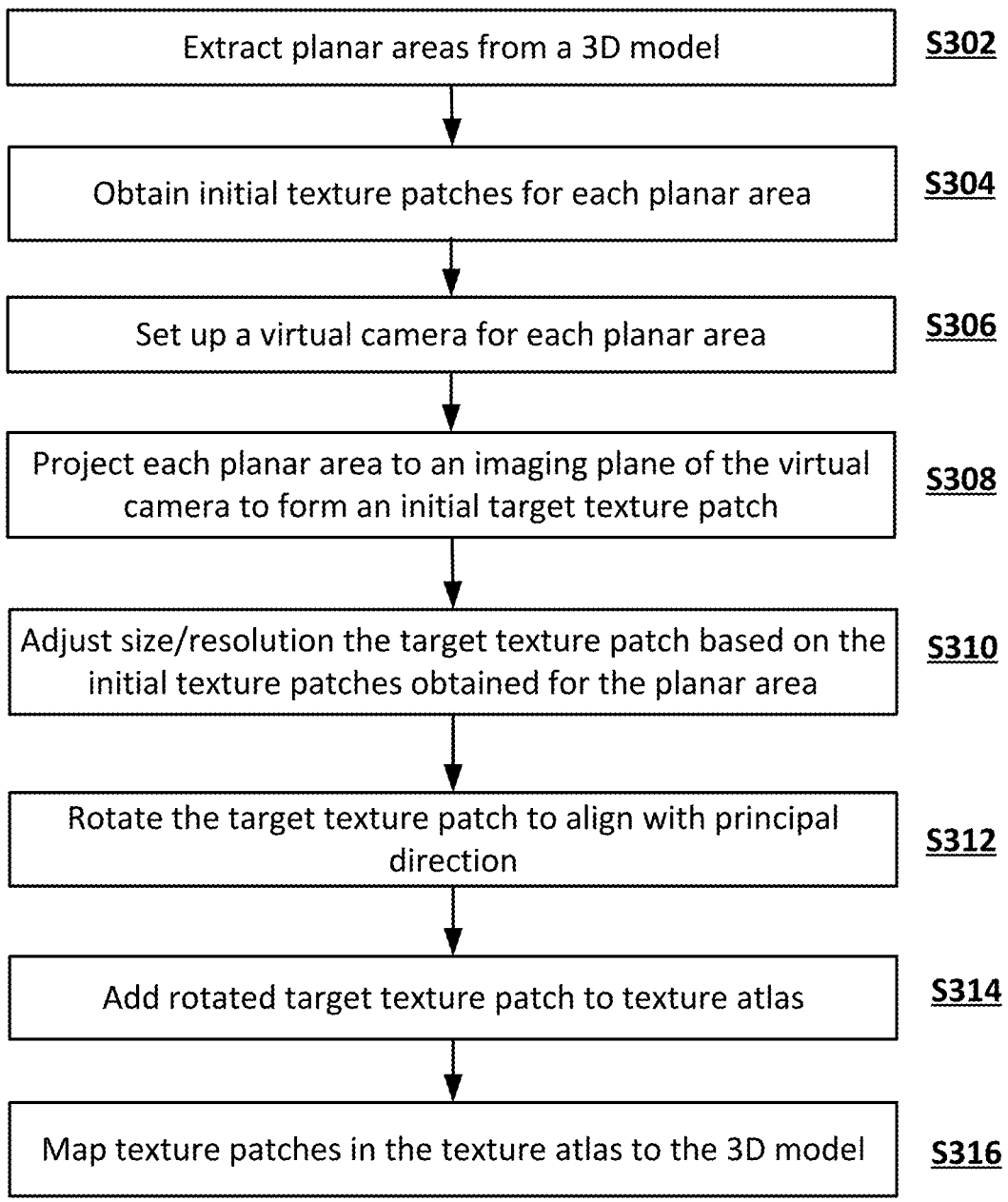
FIG. 3 is a flowchart of an exemplary method for constructing a three-dimensional model through texture mapping, according to embodiments of the disclosure.

The modules of processor 204 may be configured to execute program(s) stored in memory 206/storage 208 to perform a method for rendering 3D model. For example, FIG. 3 is a flowchart of an exemplary method 300 for constructing a three-dimensional model, according to embodiments of the disclosure. Method 300 may include steps S302-S316 as described below. It is to be appreciated that some of the steps may be optional to perform the disclosed methods provided herein. Further, some of the steps may be performed simultaneously, or in a different order than shown in FIG. 3.

In some embodiments, method 300 may be performed in real-time of a VR tour. For example, method 300 may be triggered when a user selects a property/room to tour. In some embodiments, system 200 may automatically initiate method 300 when it detects that a user logs into the VR tour application. In some embodiments, method 300 may be performed entirely or partially offline prior to the tour, especially when the amount of data for the property is large and system 200 cannot construct the three-dimensional model in real-time.

In step S302, planar area extraction unit 240 may extract planar areas from a structure mesh of the 3D model. In some embodiments, the three-dimensional model may be a model of a property, such as a house, an apartment, a townhouse, a garage, a warehouse, an office building, a hotel, and a store, etc. In some embodiments, the structure mesh may be saved as a "mesh.ply" file and stored in memory 206/storage 208. The "mesh.ply" file contains structural information of three-dimensional model 100, carried by the polygons that form the mesh. In some embodiments, the structure mesh may be constructed from point cloud data using surface reconstruction methods.

Figure 4:
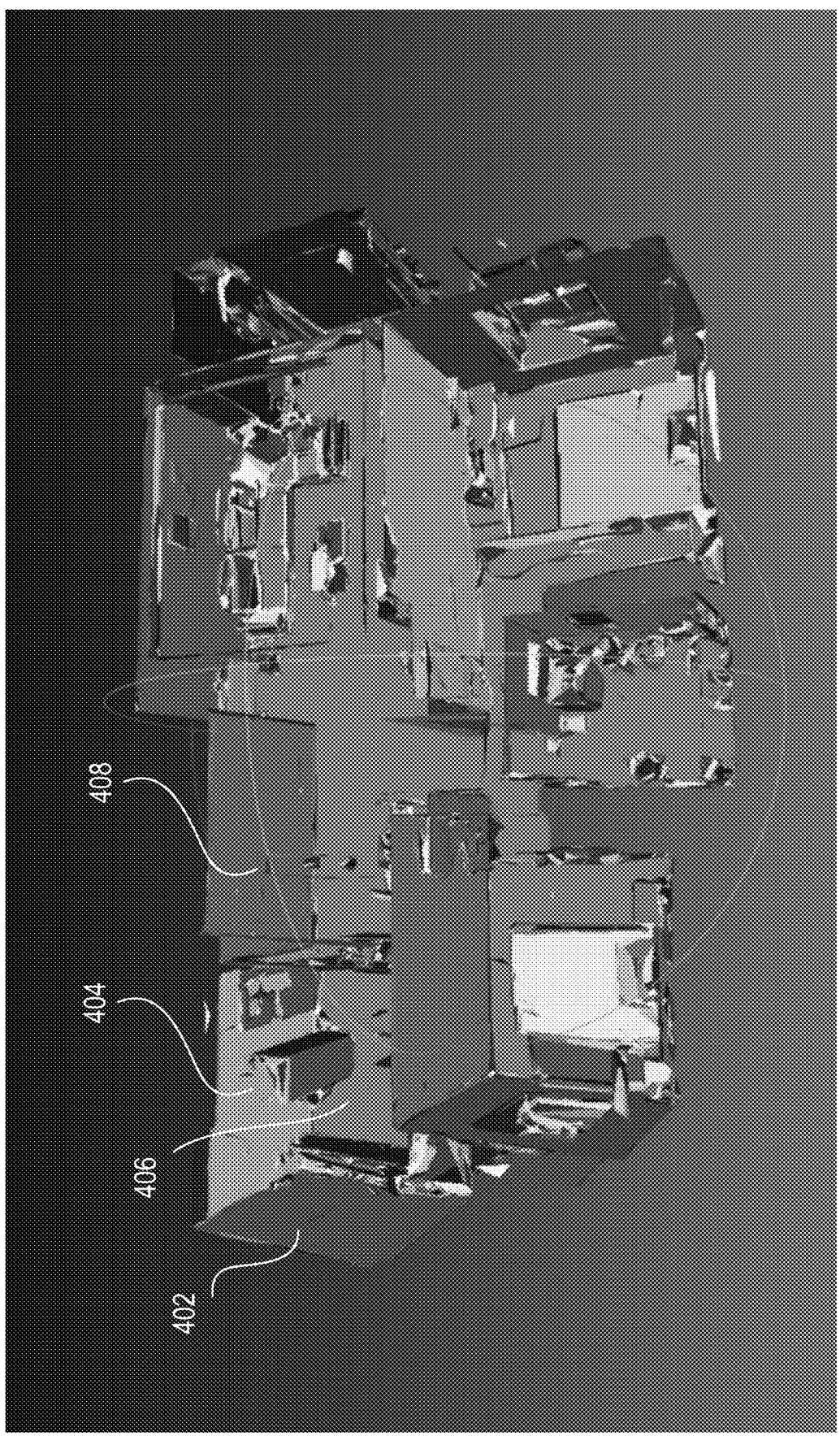
FIG. 4 illustrates exemplary planar areas extracted from a three-dimensional model of a property, according to embodiments of the disclosure.

In some embodiments, each planar area may be an area on the same plane of the structure mesh of the 3D model. The planar area may include multiple connected polygons of the structure mesh. For example, FIG. 4 illustrates exemplary planar areas extracted from a three-dimensional model of a property, according to embodiments of the disclosure. FIG. 4 shows a property with multiple living spaces (e.g., rooms). Each room has its own floor and walls. The floors and walls of different rooms can be extracted as different planar areas. For example, planar areas 402 and 404 correspond to walls of a first room, and planar area 406 correspond to the first room. Planar area 408 corresponds to a wall of a second room. Each planar area covers a continuous region with a flat or substantially flat surface (thus planar). The different planar areas in FIG. 4 are indicated by the different shades of gray.

In some embodiments, as part of step S302, planar area extraction unit 240 also records the polygons included in the planar area. The polygons may be connected and form a continuous area. These polygons and the later identified initial texture patches (in step S304) are thus associated Planar area extraction unit 240 may further determine the normal of each planar area.

In step S304, planar area extraction unit 240 may obtain initial texture patches for each planar area extracted in step S302. In some embodiments, texture information may be contained in image/videos captured of the property. The images can be matched to the polygons of the structure polygon mesh based on position information. For example, the images and the point cloud data of the structure mesh may be co-registered according to the positions (e.g., longitudes and latitudes) and angles at which they are captured. In some embodiments, one or more images may be matched to one polygon. For example, texture information of a same area of the property may be captured in multiple texture images taken from different view angles.

In some embodiments, planar area extraction unit 240 may consolidate the view angles so that the initial texture patches are obtained from as few texture images as possible. For example, to the extent texture information of a group of adjacent polygons is captured in a same texture image, the initial texture patch may be obtained by extracting and copying a bounding box enclosing a continuous texture area corresponding to the group of polygons.

Figure 5:
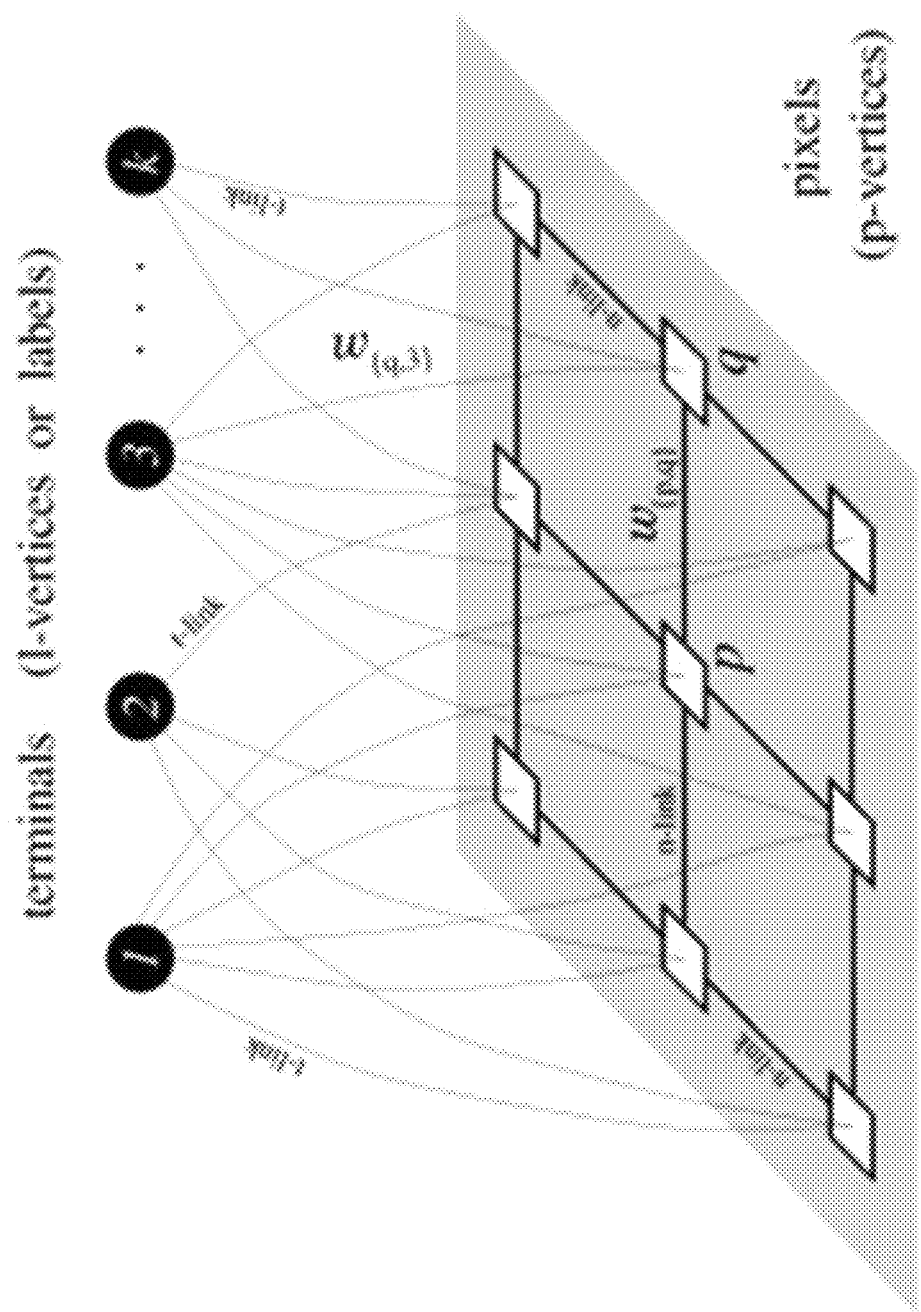
FIG. 5 illustrates an exemplary diagram of vertices and edges used for optimizing view angles for obtaining initial texture patches, according to embodiments of the disclosure.

Assuming there are n polygons in the structure mesh of the 3D model and there are m texture images. Planar area extraction unit 240 may perform an optimization to select a proper view angle for each polygon in the structure mesh, i.e., to select a proper texture image to the extent multiple texture images capture the texture information of a polygon. Planar area extraction unit 240 may construct a diagram $G=\{V, E\}$, where V is a collection of vertices and E is a collection of edges. For example, FIG. 5 illustrates an exemplary diagram of vertices and edges, according to embodiments of the disclosure. The vertices (V) include two groups: a collection of polygons $v_f^i (i=1 \ldots p)$ and a collection of texture images (labels) vi $(j=1 \ldots m)$. Similarly, the edges (E) also include two groups: the edges between two adjacent polygons referred to as n-links, and the edges between polygons and labels referred to as t-links, as shown in FIG. 5.

To optimize the view angle selection, in some embodiments, the optimization may minimize an energy function that includes a data term and a smooth term. An example of the energy function is shown in formula (1):

$$E(l)=\Sigma_{F_i \in faces} E_{data}(F_i, l_i) + \Sigma_{(F_i, F_j) \in Edges} E_{smooth}(F_i, F_j, l_i, l_j) \quad (1)$$

where the data term $E_{data} = -\int_{\mathcal{O}(F_i, l_i)} \|\nabla (G_{l_i}(p))\| dp$, and the smooth term uses a potts model, i.e., $$E_{smooth} = \begin{cases} a(l_i \neq l_j, a > 0) \\ 0(l_i = l_j) \end{cases}.$$

The optimization may be solved by appropriate methods known in the art.

In step S306, planar area extraction unit 240 may set up a virtual camera for each planar area. In some embodiments, the imaging plane of the virtual camera is parallel to the planar area. In some embodiments, the optical center of the virtual camera is on a normal of the planar area extending from a centroid of the planar area. When the imaging plane is parallel to the planar area, the normal of the planar area overlaps with the normal of the imaging plane. In some embodiments, the centroid of the planar area can be determined based on vertices of the polygons in the planar area. For example, the coordinates of the planar area can be determined by weighting the coordinates of the polygon vertices. In one example, the weights for all polygon vertices can be equally set to 1. In another example, the weights for the polygon vertices can be determined according to the respective areas of the polygons, e.g., higher weights for vertices of larger polygons. The virtual camera is placed such that the centroid of the planar area to sit on its imaging plane and the view direction of the virtual camera is parallel with the normal of the planar area. As a result of the setup, the imaging plane of the virtual camera can be determined.

In step S308, planar area extraction unit 240 may project each planar area to the imaging plane of the virtual camera. The projected 2D image on the imaging plane may form an initial target texture patch. Simulated lights may be "emitted" from the virtual camera and project the planar area onto the imaging plane. By projecting each planar area to the imaging plane, the storage space required by the planar area is reduced. Accordingly, the amount of data to be processed can reduced and the processing speed can be increased.

In some embodiments, projecting the planar area includes projecting a bounding box of the planar area to the imaging plane. The planar area may be an irregular-shaped area and its bounding box may be the smallest regular-shaped box sufficient to enclose the planar area. In some embodiments, the bounding box can be a rectangle, a square, a circle, or another regular-shaped box. For example, the bounding box can be a rectangle with its length and width encompassing the maximum coordinates of the planar area along the x-axis and the y-axis, respectively. In some embodiments, the initial target texture patch will be in the same shape as the bounding box. For example, for a rectangular bounding box, the length/width ratio of the target texture patch will be set to equal the length/width ratio of the bounding box.

Figure 6:
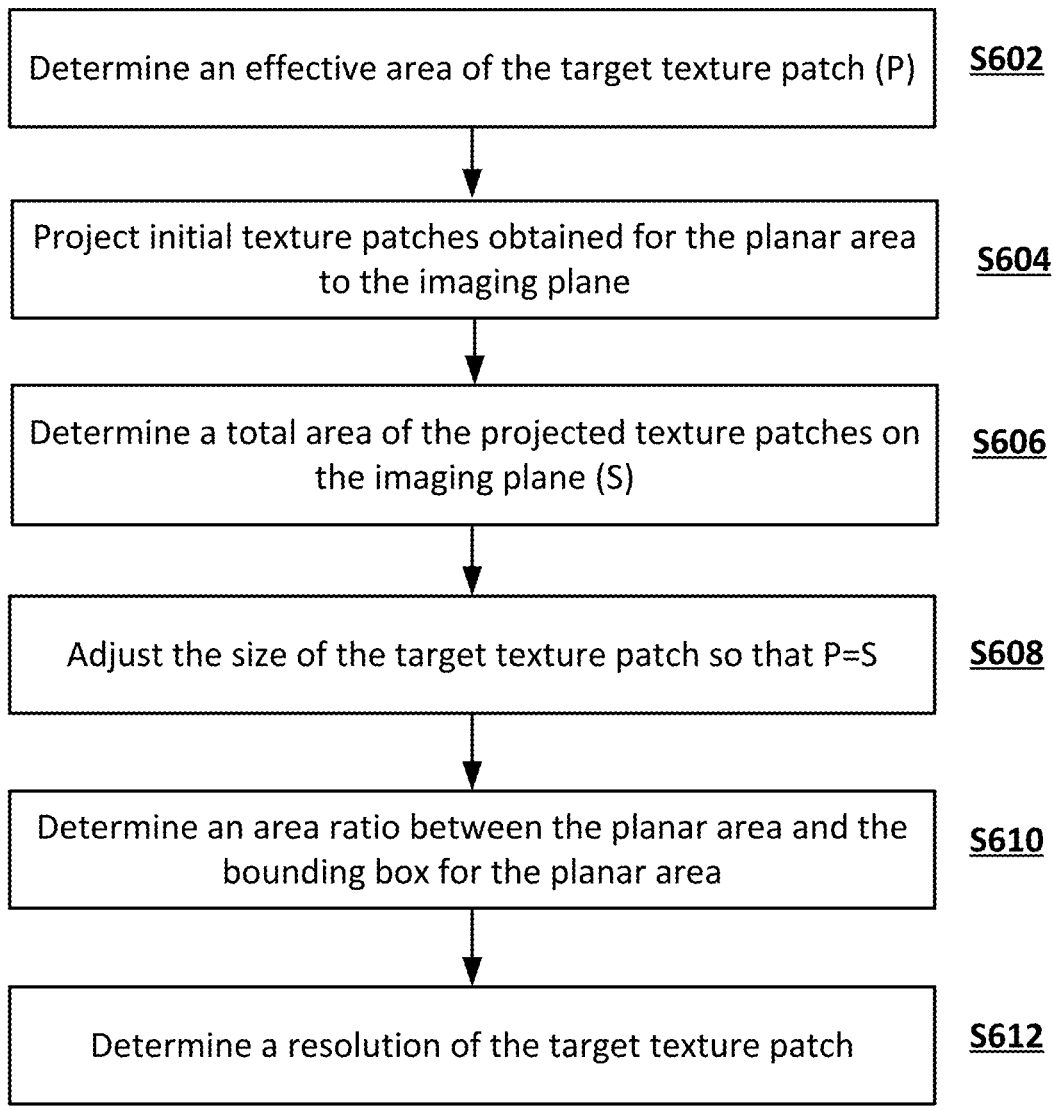
FIG. 6 is a flowchart of an exemplary method for adjusting a target texture patch for a planar area, according to embodiments of the disclosure.

In step S310, target texture patch determination unit 242 adjusts the size/resolution of the target texture patch based on the initial texture patches obtained for the planar area. In some embodiments, the initial target texture patch formed by projecting the bounding box of the planar area to the imaging plane may be adjusted in size and resolution to match with the initial texture patches. According to embodiments of the disclosure, an exemplary method 600 of FIG. 6 may be implemented by target texture patch determination unit 242 to implement step S310, for adjusting the target texture patch. Method 600 may include steps S602-S612 as described below. It is to be appreciated that some of the steps may be optional to perform the disclosure provided herein. Further, some of the steps may be performed simultaneously, or in a different order than shown in FIG. 6.

In step S602, target texture patch determination unit 242 may determine an effective area of the target texture patch (P). In some embodiments, the polygons in the planar area may be projected to the imaging plane and the effective area of the target texture patch can be calculated as the sum of areas of projected polygons. Consistent with the present disclosure, the effective area can be measured using number of pixels.

In step S604, the initial texture patches obtained for the planar area (e.g., in step S304) may be projected to the imaging plane. The projected initial texture patches may form a continuous area on the image plane. The continuous area is a projection of the planar area on the imaging plane. In step S606, target texture patch determination unit 242 may determine a total area (S) of the projected texture patches on the imaging plane. Similar to step S602, the total area can also be measured using number of pixels.

In step S608, target texture patch determination unit 242 may adjust the size of the target texture patch so that the effective area equals the total area of the projected texture patches, i.e., P=S. In some embodiments, the shape of the target texture patch remains unchanged and adjustment of the target texture patch either enlarges it or shrinks it (i.e., a zoom in or zoom out operation). The adjustment changes the size of the target texture patch, and accordingly the size of the effective area P, represented by the number of pixels therein. As a result of the adjustment of step S508, the number of pixels in P matches the number of pixels in S.

In step S610, target texture patch determination unit 242 may calculate an area ratio a between the planar area and the bounding box. In some embodiments, target texture patch determination unit 242 may determine an area of the bounding box for the planar area. For a rectangular bounding box, the area is length X width. Target texture patch determination unit 242 may further determine an area of the planar area. In some embodiments, the area of the planar area can be calculated as the sum of area of the mesh polygons in the planar area. The ratio a is then determined by dividing the area of the planar are by the area of the bounding box.

In step S612, target texture patch determination unit 242 may determine the resolution of the target texture patch. Because the target texture patch is a projection of the bounding box and the effective area is a projection of the planar area, the area ratio between the effective area and the target texture patch should be the same as area ratio a (i.e., the area ratio between the planar area and the bounding box as determined in step S610). With a known size of the effective area (i.e., P=S), the resolution of the target texture patch can be determined as S/a.

Method 600 returns the adjusted target texture patch (determined in step S608) and its resolution (determined in step S612). Returning to FIG. 3, method 300 proceeds to step S312, where the target texture patch may be rotated to align with the texture space coordinate. In some embodiments, target texture patch determination unit 242 may determine a principal direction of the target texture patch based on vertices of the target texture patch, and rotate the target texture patch to align the largest coordinate with the principal direction. In some embodiments, target texture patch determination unit 242 may a principal component analysis (PCA) method to reduce the dimension of the target texture patch from a 2D image to a one-dimension (1D) vector. Target texture patch determination unit 242 then determines the principal direction of the target texture patch as the direction of the maximum value in the 1D vector. By orienting the largest coordinate of the target texture patch along the principal direction, the area ratio between the effective area and the target texture patch can be further improved, i.e., non-effective area in the target texture patch minimized. By improving the ratio of the effective area in the target texture patch, the storage space required to store the texture information contained in the effective area can be reduced, and texture mapping efficiency can be improved.

In step S314, the target texture patch for each planar area is added to a texture atlas. The texture atlas of the 3D model may be saved, e.g., as an object file, and stored in memory 206/storage 208. During rendering and display of the 3D model, the texture atlas will be called and loaded.

Figure 7B:
FIG. 7A illustrates an exemplary texture atlas and FIG. 7B illustrates exemplary masking of the texture atlas in FIG. 7A showing effective areas containing texture information, according to embodiments of the disclosure.
Figure 7A:

FIG. 7A illustrates an exemplary texture atlas and FIG. 7B illustrates exemplary masking of the texture atlas in FIG. 7A showing effective areas containing texture information, according to embodiments of the disclosure. FIG. 7A shows that the exemplary texture atlas includes three texture patches 710, 720 and 730, corresponding to three planar areas extracted from the 3D model. FIG. 7B shows that texture patches 710, 720 and 730 have respective effective areas 712, 722 and 732 (white areas). As can be seen from FIG. 7B, the texture patches are substantially covered by their effective areas, and in other words, the area ratios of the effective areas in the respective texture patches are high. Accordingly, the non-effective areas (black areas) are minimized in the texture patches.

Figure 7D:
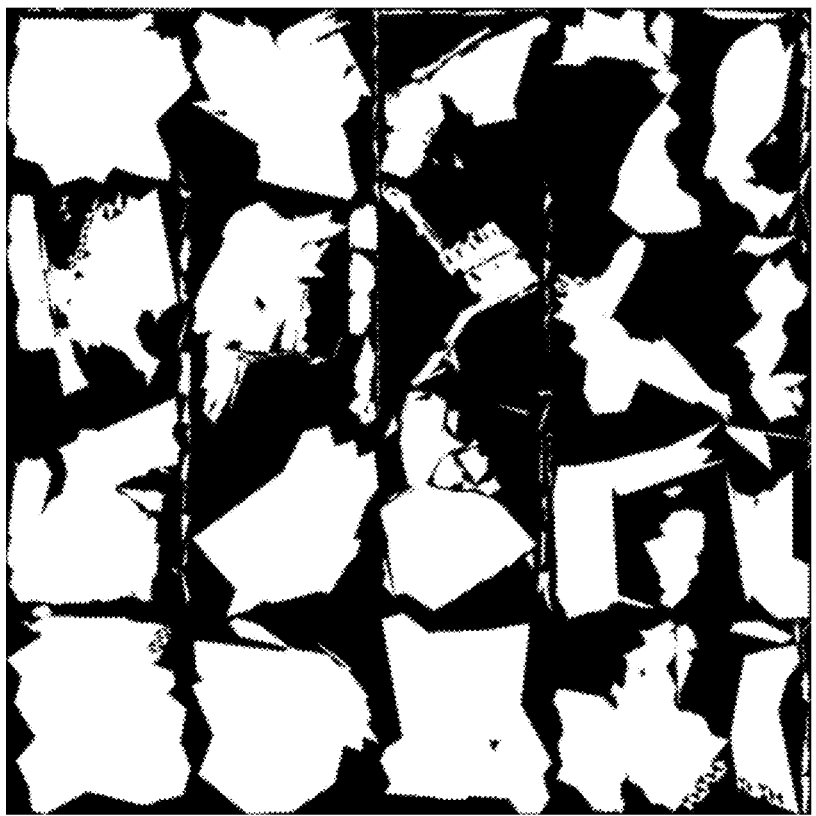
FIG. 7C illustrates an exemplary texture atlas and FIG. 7D illustrates exemplary masking of the texture atlas in FIG. 7C showing effective areas containing texture information, according to the prior art.
Figure 7C:
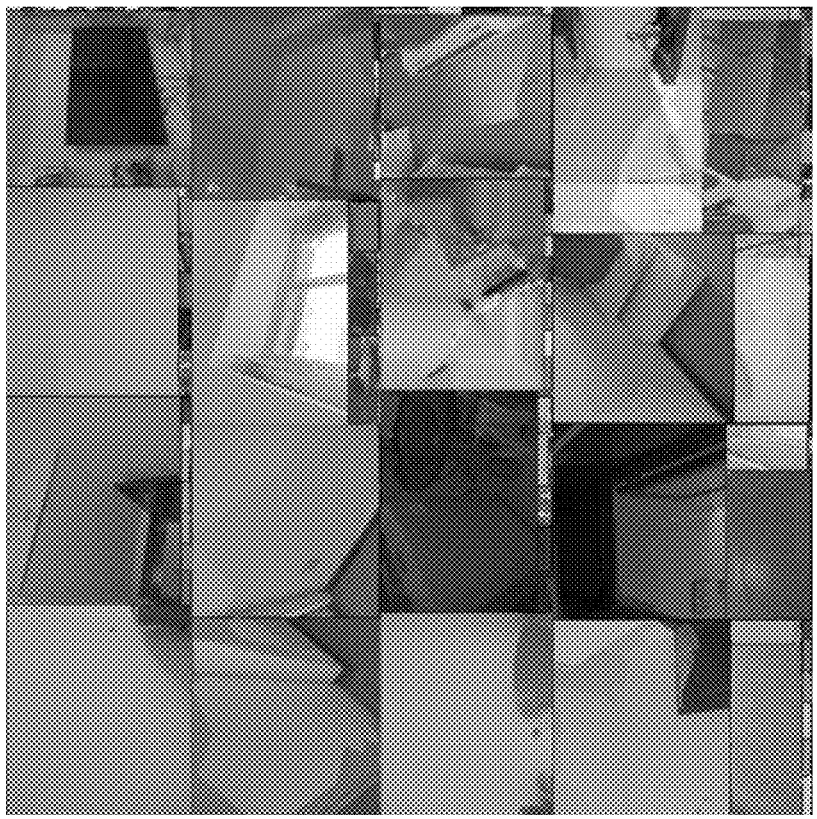

In comparison, FIG. 7C illustrates an exemplary texture atlas and FIG. 7D illustrates exemplary masking of the texture atlas in FIG. 7C showing effective areas containing texture information, according to the prior art. The texture atlas shown in FIG. 7C is created by conventional methods for a same 3D model as that of FIG. 7A. Compared with the texture atlas shown in FIG. 7A, the texture atlas shown in FIG. 7C includes significantly more texture patches each of a smaller size. As shown in FIG. 7D, the collective ratio occupied by effective areas of the texture patches is lower than that of FIG. 7B. In other words, to save the texture atlas of FIG. 7C created by the convention methods, more storage space is wasted for storing data of the non-effective areas that do not contribute to the later rendering or displaying of the 3D model. Therefore, by improving the collective ratio of the effective areas in the target texture patches, the disclosed systems and methods can reduce the storage space required to store the same amount of texture information (contained only in the effective area), and therefore improve the efficiency of texture mapping.

Returning to FIG. 3, in step S316, 3D model rendering unit 244 may map the texture patches in the texture atlas to the surface of the 3D model. In some embodiments, the texture patches may be oriented according to the orientation of the planar area on the structure mesh before being mapped. That is, the texture information in the texture patches may be captured from orientations different from the orientation of the planar areas, and thus need to be transformed accordingly.

Although the exemplary three-dimensional model used to describe the disclosed systems and methods is a model for a property, it is contemplated that the disclosed systems and methods may also be applied to construct three-dimensional models of other objects, such as a vehicle, a person, an animal, a road segment, a park, etc. A person of ordinary skill can adapt the disclosed systems and methods without undue experimentation for different three-dimensional models.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for constructing a three-dimensional virtual reality model of a property, comprising:
    a storage device configured to store a structure mesh of the three-dimensional virtual reality model and texture images captured of the property; and
    at least one processor configured to:
        extract a planar area from the structure mesh of the three-dimensional virtual reality model;
        obtain one or more initial texture patches for the planar area from the texture images;
        determine a target texture patch for the planar area from the initial texture patches projected to an imaging plane of a virtual camera;
        adjust the size of the target texture patch such that an effective area of the determined target texture patch equals a total area of the initial texture patches projected to the imaging plane of the virtual camera;
        add the target texture patch to a texture atlas; and
        construct the three-dimensional virtual reality model by mapping the texture atlas to the structure mesh of the three-dimensional virtual reality model.

2. The system of claim 1, wherein the imaging plane of the virtual camera is parallel to the planar area and an optical center of the virtual camera is on a normal of the planar area extending from a centroid of the planar area.

3. The system of claim 1, wherein to determine the target texture patch for the planar area, the at least one processor is further configured to:
    determine a bounding box for the planar area; and
    project the bounding box and the initial texture patches for the planar area to the imaging plane to form the target texture patch.

4. The system of claim 1, wherein to adjust the size of the target texture patch such that the effective area of the determined target texture patch equals the total area of the initial texture patches projected to the imaging plane of the virtual camera, the at least one processor is further configured to:
    calculate the total area of the initial texture patches projected to the imaging plane; and
    calculate the effective area of the target texture patch.

5. The system of claim 3, wherein a length/width ratio of the target texture patch equals a length/width ratio of the bounding box,
    wherein to adjust the size of the target texture patch, the at least one processor is further configured to enlarge or shrink the target texture patch by keeping the length/width ratio of the target texture patch unchanged.

6. The system of claim 3, wherein the at least one processor is further configured to:
   determine an area ratio between the planar area and the bounding box; and
   determine a resolution of the target texture patch based on the area ratio and the effective area.

7. The system of claim 1, wherein to determine the target texture patch for the planar area, the at least one processor is further configured to:
   rotate the target texture patch to align with a principal direction of the target texture patch.

8. The system of claim 7, wherein to rotate the target texture patch, the at least one processor is further configured to:
   determine the principal direction of the target texture patch based on vertices of the target texture patch; and
   rotate the target texture patch to align the largest coordinate of the target texture patch with the principal direction.

9. The system of claim 8, wherein the principal direction of the target texture patch is determined by applying a principal component analysis (PCA).

10. The system of claim 1, wherein the planar area comprises a group of adjacent polygons on the structure mesh,
    wherein to obtain the one or more initial texture patches for the planar area from the texture images, the at least one processor is further configured to:
    identify a texture image, among the texture images, that includes texture information corresponding to the group of adjacent polygon based on a solution of an optimization; and
    extract an initial texture patch from the texture image, where the initial texture patch includes the texture information corresponding to the group of adjacent polygon.

11. A computer-implemented method for constructing a three-dimensional virtual reality model of a property, comprising:
    extracting, by at least one processor, a planar area from a structure mesh of the three-dimensional virtual reality model;
    obtaining one or more initial texture patches for the planar area from texture images captured of the property;
    determining, by the at least one processor, a target texture patch for the planar area from the initial texture patches projected to an imaging plane of a virtual camera;
    adjusting, by the at least one processor, the size of the target texture patch such that an effective area of the determined target texture patch equals a total area of the initial texture patches projected to the imaging plane of the virtual camera;
    adding the target texture patch to a texture atlas; and
    constructing, by the at least one processor, the three-dimensional virtual reality model by mapping the texture atlas to the structure mesh of the three-dimensional virtual reality model.

12. The computer-implemented method of claim 11, wherein the imaging plane of the virtual camera is parallel to the planar area and an optical center of the virtual camera is on a normal of the planar area extending from a centroid of the planar area.

13. The computer-implemented method of claim 11, wherein determining the target texture patch for the planar area further comprises:
    determining a bounding box for the planar area; and
    projecting the hounding box and the initial texture patches for the planar area to the imaging plane to form the target texture patch.

14. The computer-implemented method of claim 11, wherein adjusting the size of the target texture patch such that the effective area of the determined target texture patch equals the total area of the initial texture patches projected to the imaging plane of the virtual camera further comprises:
    calculating the total area of the initial texture patches projected to the imaging plane; and
    calculating the effective area of the target texture patch.

15. The computer-implemented method of claim 13, wherein a length/width ratio of the target texture patch equals a length/width ratio of the bounding box,
    wherein adjusting the size of the target texture patch further comprising enlarging or shrinking the target texture patch by keeping the length/width ratio of the target texture patch unchanged.

16. The computer-implemented method of claim 13, further comprising:
    determining an area ratio between the planar area and the bounding box; and
    determining a resolution of the target texture patch based on the area ratio and the effective area.

17. The computer-implemented method of claim 11, wherein determining the target texture patch for the planar area further comprises:
    rotating the target texture patch to align with a principal direction of the target texture patch.

18. The computer-implemented method of claim 17, wherein rotating the target texture patch further comprises:
    determining the principal direction of the target texture patch; and
    rotating the target texture patch to align the largest coordinate of the target texture patch with the principal direction.

19. A non-transitory computer-readable medium having stored thereon computer instructions, when executed by at least one processor; perform a method for constructing a three-dimensional virtual reality model of a property, the method comprising:
    extract a planar area from a structure mesh of the three-dimensional virtual reality model;
    obtaining one or more initial texture patches for the planar area from texture images captured of the property;
    determining a target texture patch for the planar area from the initial texture patches projected to an imaging plane of a virtual camera;
    adjusting the size of the target texture patch such that an effective area of the determined target texture patch equals a total area of the initial texture patches projected to the imaging plane of the virtual camera;
    adding the target texture patch to a texture atlas; and
    constructing the three-dimensional virtual reality model by mapping the texture atlas to the structure mesh of the three-dimensional virtual reality model.

20. The non-transitory computer-readable medium of claim 19, wherein determining the target texture patch for the planar area further comprises:
    determining a hounding box for the planar area; and
    projecting the bounding box and the initial texture patches for the planar area to the imaging plane to form the target texture patch.

* * * * *